Oct. 28, 1941.    H. RICHTER    2,260,789
OUTFLOW REGULATOR FOR PETROLEUM SEPARATORS
Filed July 29, 1939    2 Sheets-Sheet 1

INVENTOR
HANS RICHTER
BY
*Richards & Geier*
ATTORNEYS

Oct. 28, 1941.     H. RICHTER     2,260,789
OUTFLOW REGULATOR FOR PETROLEUM SEPARATORS
Filed July 29, 1939     2 Sheets-Sheet 2

INVENTOR
HANS RICHTER
BY
ATTORNEYS

Patented Oct. 28, 1941

2,260,789

UNITED STATES PATENT OFFICE 2,260,789

OUTFLOW REGULATOR FOR PETROLEUM SEPARATORS

Hans Richter, Bremen, Germany, assignor to Gustav F. Gerdts, Bremen, Germany

Application July 29, 1939, Serial No. 287,216
In Germany August 23, 1938

2 Claims. (Cl. 137—68)

This invention relates to outflow regulators for petroleum separators.

Petroleum separators are used for the purpose of collecting petroleum flowing out of the bore-holes and separating it from gases which escape from the bore-holes along with the petroleum.

Usually the gases are allowed to escape through a passage provided at the top of the separator, while petroleum is transmitted to various machines for further treatment.

In prior art, it was found advantageous to provide a measuring instrument between an outflow valve and the separator for the purpose of measuring the amount of the out-flowing petroleum and the like. It was found, however, that the pointers or indicators of these measuring instruments are subjected to very strong vibrations and that it is very difficult to planimeter the readings.

An object of the present invention is the provision of an outflow regulator which is so constructed that the flow of petroleum from the separator will be substantially uniform.

Another object is the provision of a valve regulator which is operated by a single float and which is simple and sturdy in construction and efficient in operation.

A further object is the provision of a valve regulator which is so constructed that when the level of the liquid in the separator is low, the liquid flows out of the separator through a comparatively narrow passage, and when the level is high the liquid flows through a wider passage, thereby making it possible to obtain exact readings of the measuring instrument, irrespective of the amount of liquid in the separator.

Other objects of the present invention will become apparent in the course of the following specification.

The objects of the present invention may be realized through the provision of an outflow regulator having a single float which can open two valves consecutively, a comparatively small valve being opened when the level of the liquid in the separator is low, while a larger valve is opened at a time when the level of the liquid is substantially increased.

Preferably, the liquid continues to flow through the small valve while the level of the liquid in the separator changes to a considerable extent, since only after a considerable rising of the level will sufficient force be exerted upon the float to open the larger valve. If necessary, the valve body of the smaller valve may be provided with additional weights, so that it will maintain the outflow passage closed when pressure in the separator is small; the weights may be so selected that the smaller valve will open only when the level of the liquid in the separator has reached a desired predetermined height.

The mechanism which transmits the movements of the float to the two valves interconnected in series is enclosed by a pipe or a tubular casing directly connecting the pressure chamber of the separator with the valve casing, thereby avoiding the necessity of using stuffing boxes.

The pipe or casing containing this transmission is situated at a comparatively high level and, if necessary, is provided within or attached to a cupola-like cover of the separator casing, so that it is contacted only by the gases separated from petroleum in the separator and not with the liquid petroleum itself. Due to this arrangement, in spite of the absence of stuffing boxes or other liquid-tight connecting means, petroleum can flow to the outflow valve and for further treatment only through the measuring instrument.

The invention will appear more clearly from the following detailed description when taken in connection with the accompanying drawings showing by way of example a preferred embodiment of the inventive idea.

Figure 1:
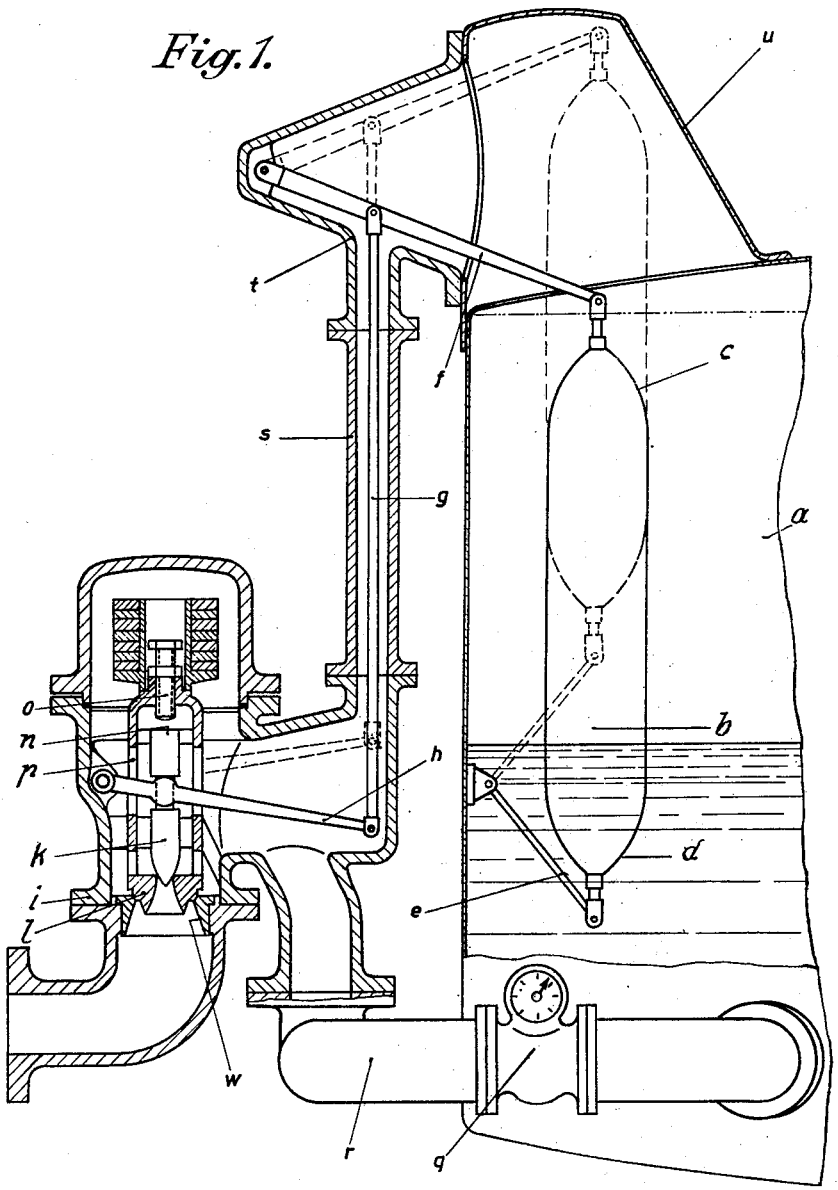
Figure 1 is a vertical section through an outflow regulator constructed in accordance with the principles of the present invention, some parts being shown in side elevation.

The device shown in the drawings comprises a large container $a$ constituting the casing of the separator. A float $b$ is situated within the casing $a$. The float $b$ extends vertically and is provided with a cylindrical middle portion and two tapered or converging ends $c$ and $d$. The float $b$ is so constructed and of such size that in order to open the small valve the float must be contacted by the liquid within the container $a$, and it causes the second larger valve to open at a time when the rising level of the liquid within the container $a$ reaches the upper portion of the float.

The lower end $d$ of the float $b$ is pivotally connected with one end of a lever $e$ the opposite end of which is rotatably mounted in a support carried by the inner wall of the casing $a$. The lever $e$ serves solely for the purpose of guiding the float $b$. The upper end $c$ of the float $b$ is pivotally connected with one end of a lever $g$, the opposite end of which is pivotally mounted in a support situated within an auxiliary casing $t$ which is carried by an upper casing or cupola-like cover $u$ mounted upon the container $a$. The casings $t$ and $u$ are so dimensioned that they allow free movement of the float $b$ and of the lever $f$.

The lever $f$ is connected intermediate its ends to a transmission rod $g$, which is pivotally connected to one end of a lever $h$. The opposite end of the lever $h$ is rotatably mounted in a support carried by the valve casing $i$.

The casing $i$ contains two valves which are interconnected in series and which comprise the valve bodies $k$ and $l$ respectively.

The lever $h$ engages the smaller valve body $k$ having a lower conical end which is adapted to close an opening provided in the second larger valve body $l$.

The valve body $k$ may be provided with an additional weight $n$ bearing downwardly upon the conical end of the valve body $k$. The weight $n$ constituting a part of the valve body $k$ is adapted to engage a stop screw $o$, which is carried by a cage-like body $p$ integral or firmly connected with the second valve body $l$. The position of the screw $o$ within the body $l$ may be adjusted at will. The lever $h$ extends through suitable openings provided in the body $p$, and the valve $k$ is movable within that body.

The valve casing $i$ which carries a cover surrounding the upper end of the body $p$, has two tubular extensions, one of which is connected with a pipe or tube $s$ constituting a casing for the transmission rod $g$. The pipe $s$ is connected in a liquid-tight manner with the casing $t$ and the valve casing $i$. The second tubular extension of the valve casing $i$ is firmly connected with the pipe $r$ carrying the measuring instrument $q$.

Figure 4:
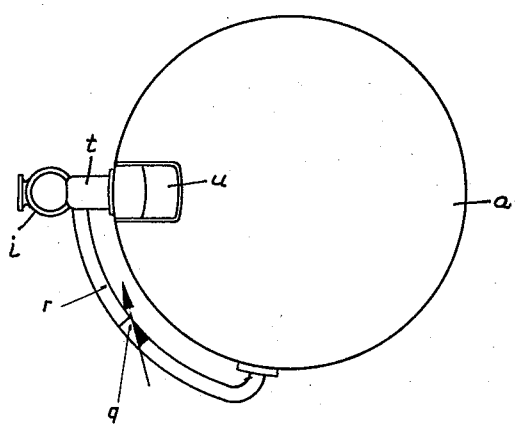
Figure 4 is a diagrammatic top view of the separator and the outflow regulator connected therewith.

As shown in Figure 4, the pipe $r$ is arcuate in form and extends substantially parallel to the round side surfaces of the container $a$, connecting the valve casing $i$ with the outflow opening of the container $a$.

The second valve body $l$ is adapted to close an opening constituted by a valve seat $w$, which is firmly mounted in an outflow pipe connected to the valve casing $i$ and leading to the installation wherein petroleum is further treated.

Figure 2:
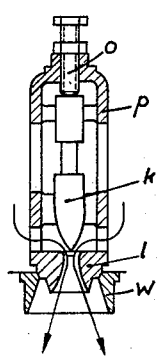
Figure 2 is a diagram illustrating the flow of the liquid through the small valve.
Figure 3:
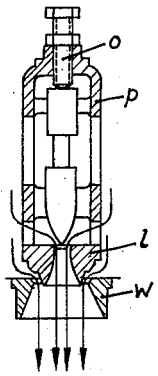
Figure 3 is similar to Figure 2 and illustrates the flow of the liquid through both valves.

The device is operated as follows:

When the liquid in the container $a$ has reached a predetermined comparatively low level, it will move the float $b$ upwardly and the float will then cause the levers $e$ and $f$ to turn about their pivots. The lever $f$ will move the transmission rod $g$ upwardly and since the rod $g$ is connected with the lever $h$, the small valve body $k$ will move upwardly along with the lever $h$ and will free the passage provided in the second valve body $l$. This position is diagrammatically illustrated in Figure 2 of the drawings. In this position the second valve body $l$ is pressed against the valve seat $w$ by the pressure of the liquid and if necessary, by additional weights placed upon the body $p$. The liquid in the container $a$ will then flow through the pipe $r$ containing the measuring instrument $q$ into the valve casing $i$ and the body $p$ and will flow out of the separator through the passage provided within the second valve body $l$. The flow of the liquid will be substantially constant and will depend only upon the pressure in the separator. The measuring instrument $q$ will, therefore, indicate steadily the amounts of the outflowing liquid.

If the level of the liquid within the container $a$ continues to rise, the float $b$ will continue to move upward and actuate the lever $f$, the rod $g$ and the lever $h$, causing the part $n$ of the smaller valve body $k$ to strike against the lower end of the screw $o$.

In the course of a further movement of the float $b$, the valve body $k$, which is now in engagement with the screw $o$, will move upwardly along with the body $p$, thereby raising the larger valve body $l$ from its valve seat $w$.

The float $b$ should be of such dimensions that the force exerted upon it will not suffice to raise the second valve body $l$ unless the level of the liquid in the container $a$ is sufficiently high and the float $b$ is sufficiently immersed in the liquid.

The cross-sections of the openings formed in the valve body $l$ and in the valve seat $w$, are of such dimensions that when they are both open, no greater drop in pressure takes place than that which corresponds to the static pressure of the liquid situated in the pipe $s$. Therefore, no suction of this liquid can take place, and the gases cannot escape along with the liquid. The level of the liquid within the pipe $s$ merely drops gradually when both valves are open. The difference in the heights of the liquid in the pipe $s$ and the container $a$ is compensated by the liquid, which, following the principle of communicating tubes, flows out of the separator $a$ through the pipe $r$ toward the pipe $s$. Since this liquid must flow through the measuring instrument $q$ provided in the pipe $r$, the measuring instrument $q$ will always indicate the correct amount of the flowing liquid.

Obviously, the liquid within the pipe $s$ will tend to assume the same level as that of the liquid in the container $a$.

The pipe $s$ enclosing the rod $g$, is connected to the casing $t$ supporting the lever $f$ in such manner that it is not necessary to use a stuffing box as a liquid-tight connection. The casing $u$ to which the casing $t$ is attached, is located at such high level that it always contains gas and never contains any liquid.

As shown in Figure 4, the outflow regulator constructed in accordance with the principles of the present invention is attached to the separator casing $a$ at an angular distance from the outflow opening of this casing, thus making it possible to arrange the measuring instrument $q$ between the separator and the outflow valve and at the same time to provide the outflow valve closely to the casing $a$. The pipe $r$ carrying the measuring instrument $q$ and connecting the outflow opening of the separator with the valve casing $i$ is arcuate in form and extends parallel to the side surfaces of the casing $a$.

It is advisable to provide a strongly diverging passage close to the valve seat $w$ by correspondingly shaping its side surfaces in order to increase the space for the outflow of the liquid. Due to the provision of this space, no balancing of pressure at the time of the opening of the smaller passage by the smaller valve body $k$, which is caused by the out-flowing liquid, can take place. If the passage of the valve seat $w$ were not widened, the out-flowing liquid would exert an upward pressure upon the larger valve body $l$. Due to the inclined form of the side surfaces of the valve seat $w$, full pressure of the liquid is exerted downwardly upon the valve body $l$, which is pressed against the valve seat $w$, even when the valve body $k$ opens the passage within the valve body $l$.

The described outflow regulator makes it possible to provide a rapid flow of the liquid out of the separator at a time when large masses of petroleum are ejected out of the earth with great force, thereby preventing an overflow of petroleum to the conduits designed for the transmission of gases. Furthermore, since only the smaller passage is open when the level of the liquid is low, it is possible to regulate precisely the amounts of the outflowing liquid even when these amounts are comparatively small.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. Outflow regulator for petroleum separators, said regulator comprising a movable float, a casing enclosing said float and adapted to be filled with liquid into which said float is immersed, a lever having one end connected with said float, means connected with said casing and constituting an auxiliary chamber communicating with the interior of said casing, said means including a pivot for the other end of said lever; a movable valve body, means constituting another movable valve body which is larger than the first-mentioned valve body and which has an opening formed therein and adapted to be closed by the smaller valve body, means connected with the larger valve body and constituting a stop for the movement of the smaller valve body, another lever operatively connected intermediate its ends with the smaller valve body, a transmission rod having one end connected with the first-mentioned lever and the other end connected with an end of the second-mentioned lever, means connected with the means constituting said auxiliary chamber and constituting another auxiliary chamber communicating with the first-mentioned auxiliary chamber and containing said transmission rod, and means constituting a passage communicating with the interior of said casing and said other auxiliary chamber, said passage being adapted to be closed by the larger valve body.

2. Outflow regulator for petroleum separators, said regulator comprising a movable float, a substantially vertical casing enclosing said float and adapted to be partly filled with liquid petroleum into which said float is immersed, a lever having one end situated in the upper portion of said casing and connected with said float, means connected with the upper portion of said casing and constituting an auxiliary chamber situated substantially above said casing and communicating with the interior thereof, whereby said auxiliary chamber is adapted to be filled with gas and is devoid of liquid petroleum, said means including a pivot for the other end of said lever; a movable valve body, means constituting another movable valve body which is larger than the first-mentioned valve body and which has an opening formed therein and adapted to be closed by the smaller valve body, means connected with the larger valve body and constituting a stop for the movement of the smaller valve body, another lever operatively connected intermediate its ends with the smaller valve body, a transmission rod having one end connected with the first-mentioned lever and the other end connected with an end of the second-mentioned lever, means connected with the means constituting said auxiliary chamber and constituting another auxiliary chamber communicating with the first-mentioned auxiliary chamber and containing said transmission rod, and means constituting a passage communicating with the interior of said casing and said other auxiliary chamber, said passage being adapted to be closed by the larger valve body.

HANS RICHTER.